United States Patent [19]

O'Brien et al.

[11] Patent Number: 5,303,080
[45] Date of Patent: Apr. 12, 1994

[54] BEAM SCANNING SYSTEM INCLUDING ACTIVELY-CONTROLLED OPTICAL HEAD

[75] Inventors: Michael J. O'Brien; William B. Smith, both of Rochester, N.Y.

[73] Assignee: Eastman Kodak Company, Rochester, N.Y.

[21] Appl. No.: 41,730

[22] Filed: Apr. 1, 1993

[51] Int. Cl.5 ............................................ G02B 26/08
[52] U.S. Cl. ................................... 359/196; 359/820; 359/210; 359/824; 369/44.15; 235/472
[58] Field of Search ............... 359/820, 196, 198, 199, 359/209, 210, 212, 216, 217, 218, 219, 813, 814, 823, 824; 369/44.15, 44.16; 250/203.1, 561, 235, 236; 235/462, 472

[56] References Cited

U.S. PATENT DOCUMENTS

| | | | |
|---|---|---|---|
| 4,205,350 | 5/1980 | Gunning | 359/217 |
| 4,318,582 | 3/1982 | Minoura et al. | 359/217 |
| 4,841,135 | 6/1989 | Goto et al. | 359/218 |
| 4,971,413 | 11/1990 | Inoue | 359/217 |
| 5,144,120 | 9/1992 | Krichever et al. | 235/472 |
| 5,210,650 | 5/1993 | O'Brien et al. | 359/820 |
| 5,225,924 | 7/1993 | Ogawa et al. | 359/196 |

Primary Examiner—Loha Ben
Attorney, Agent, or Firm—Thomas H. Close; Mark Z. Dudley

[57] ABSTRACT

Beam scanning system that incorporates an actively-controlled optical head, wherein a light beam source and collimating optics are mounted in an active, thermally-compensated assembly. A collimating optics mount preferably in the form of a flexure plate having a three-point elastic hinge is supported on a base plate by a respective number of equally-spaced actuators. The motion of the flexure plate is thereby over constrained and allows the operation of the elastic hinge to benefit from elastic averaging such that motion of the flexure plate may be effected by the actuators individually or in combination. Controlled flexure plate motion may be implemented to compensate for thermal shifts in system focal length, while maintaining radial and angular alignment of the collimating optics relative to the beam source, according to the influence of the individual actuators. Active control of the actuators also allows controlled movement of the collimating lens in two degrees of lateral motion (x and y motions), in addition to a piston or z motion, and tilting or tipping motions. Active control of the actuators is effected according to a control system that uses an influence matrix derived from one or more transfer function matrices to relate the position control signals to the control of desired beam scanning optical performance parameters, such as beam position or beam focus.

11 Claims, 6 Drawing Sheets

BEAM SCANNING SYSTEM INCLUDING ACTIVELY-CONTROLLED OPTICAL HEAD

CROSS REFERENCE TO RELATED APPLICATIONS

This patent application is related to copending, commonly-assigned U.S. patent application Ser. No. 996,427, filed in the names of O'Brien et al on Dec. 23, 1992, and entitled "THERMALLY-CONTROLLED ROTARY DISPLACEMENT ACTUATOR OPERABLE FOR PRECISE DISPLACEMENT OF AN OPTICAL OR MECHANICAL ELEMENT", and to copending, commonly-assigned U.S. patent application Ser. No. 041,641, filed in the names of O'Brien et al. on even date herewith, and entitled "ACTIVELY ATHERMALIZED OPTICAL HEAD ASSEMBLY"; the disclosures of which are included herein by reference.

FIELD OF THE INVENTION

The present invention relates generally to a collimated light beam source and in particular to an actively controlled, dimensionally-stable light beam source and light beam collimating assembly for use in high resolution beam scanners.

BACKGROUND OF THE INVENTION

Light beam scanners used for input or output of a high resolution image require a dimensionally-stable beam source and beam collimating assembly, sometimes termed an "optical head". Such an assembly typically includes a light beam source, a collimating lens, and a means for maintaining a constant beam focal distance over the operating temperature range. In order to achieve adequate optical performance, the optical head must maintain a predetermined beam quality over a wide ambient temperature range.

In conventional apparatus, the beam source and collimating lens are mounted in a mechanical structure that attempts to maintain the beam focal length while the apparatus undergoes temperature-induced structural changes. Such athermalization (i.e., thermal compensation) is effected either passively or actively. Passive systems rely on the differences in the coefficients of thermal expansion of various movable elements in the optical system such that there is net focal shift over temperature. Active systems compensate in the same manner, but employ actuators to effect movement of the optical elements. However, the foregoing approaches have been found to be more costly and complex, and offer less precision and less range of adjustment, than is desired for certain beam scanning applications.

Additionally, some conventional optical head assemblies are supported by an orthogonal four-point mechanical system, whereby the collimating optical components are located on a solid yoke that is separated from the beam source by four motor devices. All motion of the yoke is constrained by the action of four respective pin hinges. Any movement of the yoke requires a push-pull operation of at least two opposing motors and hinges in tandem (e.g., one upward, and one downward) to achieve a particular, albeit limited, amount of repositioning of the collimating optical components. An optical head assembly that offers more freedom of motion of the collimating optics, and a simpler control apparatus for effecting such motion, would be advantageous.

SUMMARY OF THE INVENTION

The present invention is directed to overcoming one or more of the problems set forth above by active control of an optical head to achieve not only active athermalization of the beam collimation, but also improvements in the optical quality of the beam provided by the optical head, such as an increased accuracy in the steering or focusing of the light beam, by offering a greater freedom of motion of the means that support the collimating optics. Briefly summarized, according to one aspect of the present invention, a preferred embodiment of a beam scanning system may be constructed to include an optical head assembly for controlling the provision of a collimated light beam in response to an applied optical head control signal; a beam deflector for imparting a scanning motion to the collimated light beam to thereby produce a scanning beam; sense signal provision means for providing sense signals indicative of one or more parameters indicative of the optical performance of the scanning beam; and a control system, responsive to the sense signals, for computing the optical head control signal according to a predetermined beam scanning system influence matrix.

A preferred embodiment of a beam scanning system may also be constructed to include an optical head assembly having a light beam source and collimating optics, both of which are mounted in an active, thermally-compensated assembly. The beam source is mounted in a beam source mount that is thermally isolated from a supporting base plate. The collimating lens is mounted on a collimating optics mount preferably in the form of a flexure plate having a three-point elastic hinge. The flexure plate is supported on the base plate by a three actuators each of which are located adjacent one of three elastic kinematic hinges. The actuators are operatively connected to an actuator control interface that is responsive to control signals for activation and control of the actuators. Active control of the actuators thereby allows controlled movement of the collimating lens in three degrees of axial motion (x, y, and z motions), in addition to tilting or tipping motions. Controlled flexure plate motion may also be implemented to compensate for thermal shifts in system focal length, while maintaining radial and angular alignment of the collimating optics relative to the beam source, according to the displacement effected by the individual actuators. The optical head is operatively connected to an actuator control system for generation of actuator position control signals. One or more sensors are provided for detecting useful indicators of conditions that determine the optical performance of the scanning system, such as beam focus, beam position, and temperature. The sense signals are acquired by analog signal conditioning and multiplexing circuitry and then a computer processes the acquired input data according to a predetermined system influence matrix that is based on a series of transfer functions, so as to output control signals to three actuator controllers that respectively provide actuator drive signals to the three actuators.

These and other aspects, objects, features and advantages of the present invention will be more clearly understood and appreciated from a review of the following detailed description of the preferred embodiments and appended claims, and be reference to the accompanying drawings.

DETAILED DESCRIPTION OF THE INVENTION

A beam scanning system constructed according to the prior art typically employs fixed optics and is subject to long term drift as well as thermal shifts which degrade the image quality of the scanned image. Accordingly, in a preferred embodiment of the present invention, a beam scanning system may be constructed to include an athermalized, actively-controlled optical head assembly with associated sensing and control electronics useable to correct not only shifts in the beam focus but also beam position drift, beam focus, and other optical performance parameters. The scanning beam in the contemplated beam scanning system is thereby more accurately controlled even under the influence of the disturbance spectrum typically encountered by an optical head in a beam scanning apparatus.

Figure 1:
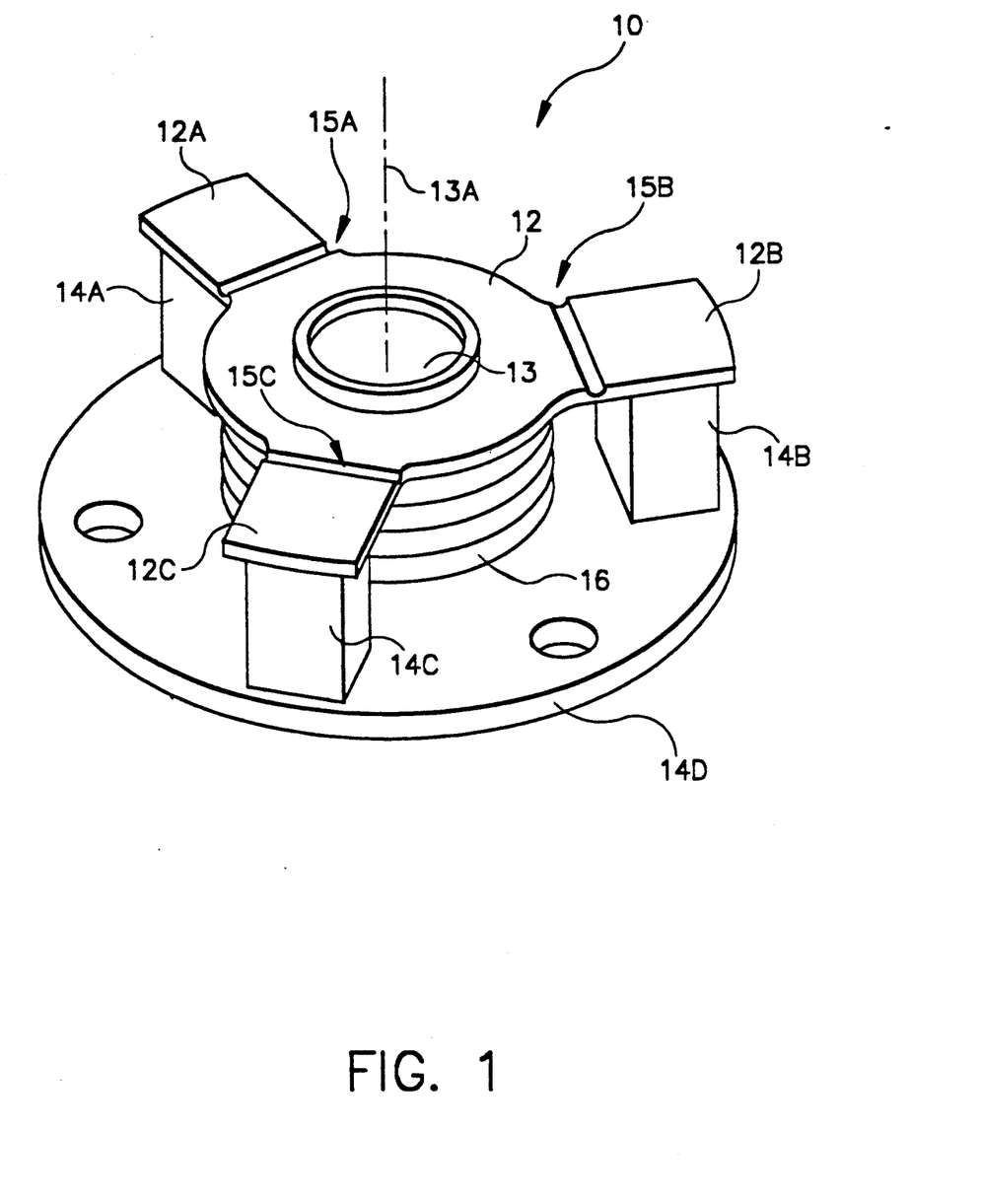
FIG. 1 is a side perspective view of an optical head assembly constructed according to the present invention.
Figure 2:
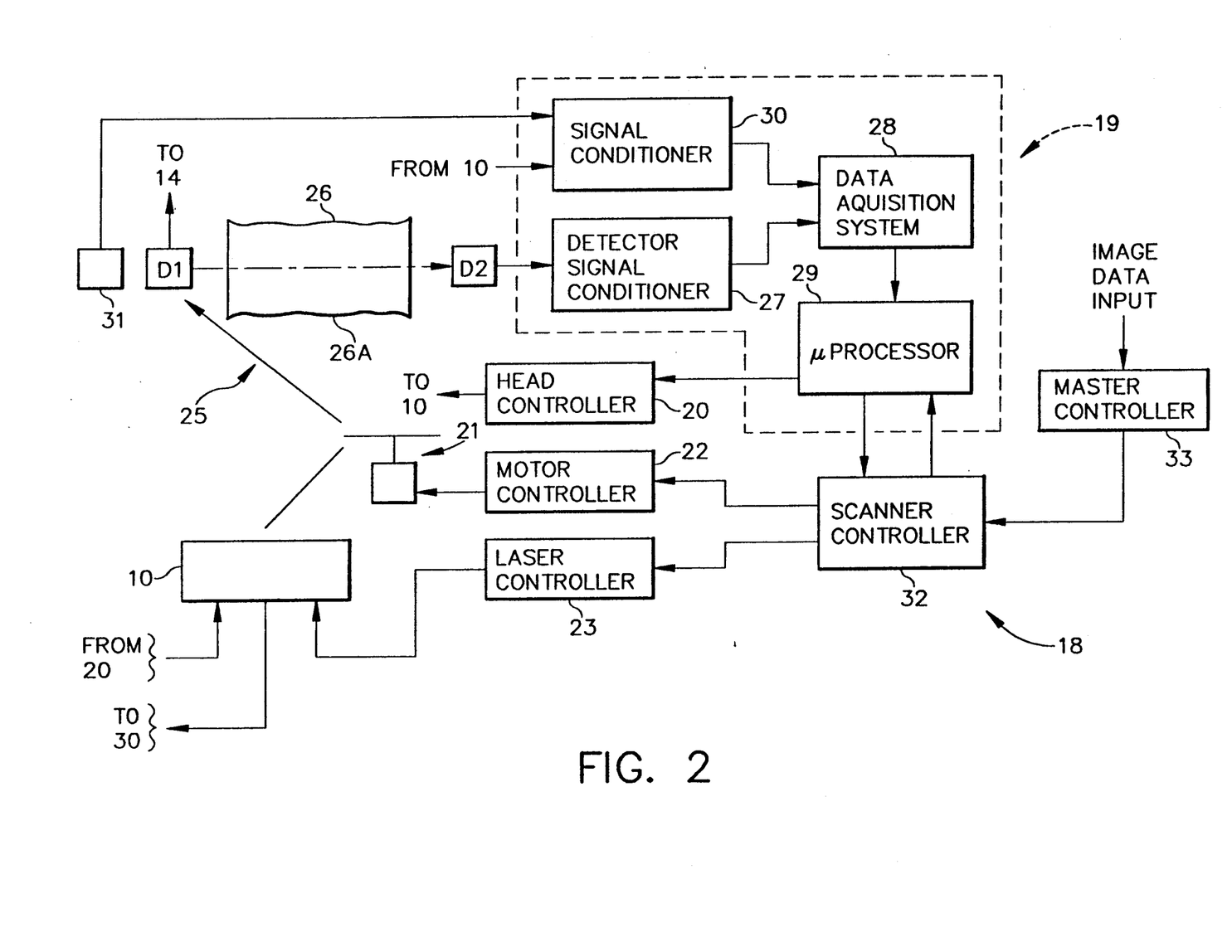
FIG. 2 is a simplified schematic representation of a beam scanning system constructed according to the present invention that incorporates the optical head assembly of FIG. 1.

Accordingly, FIG. 1 illustrates an actively-controlled optical head assembly 10 operable for compensation (athermalization) of thermally-induced focal shifts, and for improvement of the optical performance of the optical head, so as to effect an overall improvement in image quality in the contemplated beam scaning system illustrated in FIG. 2. With reference in particular to FIG. 1, a collimating optics mount in the form of a flexure plate 12 includes collimating optics in the form of a collimating lens 13, a plurality of lens mount extensions 12A, 12B, 12C distributed equally about the optical axis 13A of the lens, and respective elastic kinematic hinges in the form of annular notches 15A, 15B, and 15C. Each extension is supported by actuator means preferably in the form of one of three respectively-spaced, individually-controllable actuators 14A, 14B, 14C that are fixably supported by a beam source mount in the form of a base plate 14D. Each actuator may be selectively controlled to apply a displacement force that is coupled to the flexure plate by way of the respective elastic kinematic hinge.

The actuators 14A, 14B, 14C are preferably positioned at 120, 240, and 360 degree points about the optical axis 13A. Each actuator is preferably provided in the form of a thermal rotary moment actuator (such as the embodiment described in U.S. patent application Ser. No. 996,427, filed in the names of O'Brien et al on Dec. 23, 1992, and entitled "THERMALLY-CONTROLLED ROTARY DISPLACEMENT ACTUATOR OPERABLE FOR PRECISE DISPLACEMENT OF AN OPTICAL OR MECHANICAL ELEMENT", the disclosure of which is included herein by reference.) However, other selectively controllable actuators are suitable.

Figure 7:
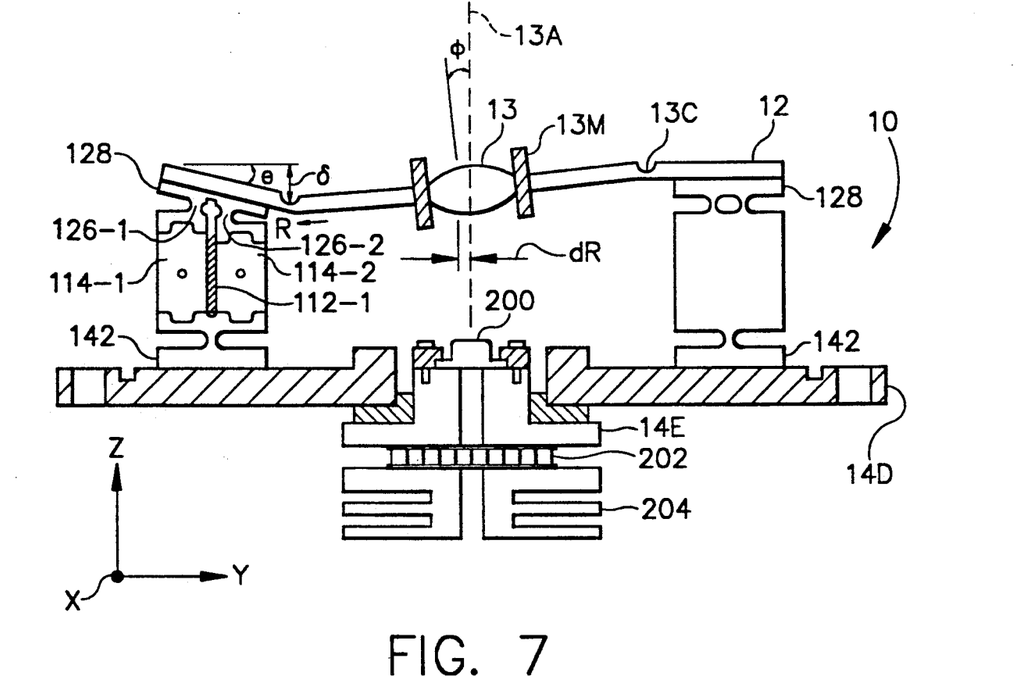
FIG. 7 is a simplified side sectional view of the optical head assembly in the system of FIG. 2.

The beam source mount 14E includes a light beam source, preferably in the form of a semiconductor laser diode 200, and an optional light beam source cooling apparatus 202, 204 (both of which are shown in FIG. 7). A bellows 16 connected between the flexure plate 12 and the base plate 14D encloses the volume between the light beam source and the collimating lens, and is preferably filled with dry nitrogen.

Selective positioning of the collimating lens 13 by an actuator-induced displacement coupled to the flexure plate 12 will effect both athermalization of the collimating optics, and repositioning of the location and orientation of the collimating lens 13 and the optical axis 13A. Hence, such an adjustment of the collimating lens position will effect a change in the corresponding location and orientation of the light beam emitted by the beam source. For clarity, the light beam is not illustrated but may be assumed to exit the optical head along the optical axis when the optical axis is coaxially aligned with the exit aperture of the beam source.

Further details regarding the preferred embodiment of the optical head assembly 10 may be found in a commonly-assigned, copending U.S. patent application Ser. No. 041,641, filed in the names of O'Brien et al. on even date herewith, and entitled "ACTIVELY ATHERMALIZED OPTICAL HEAD ASSEMBLY"; the disclosure of which is included herein by reference.

With reference now to FIG. 2, the optical head assembly 10 is contemplated for use in a beam scanning system 18 for the production of scanned images in an imaging apparatus, such as an image-writing copier or printer. A principal feature of the contemplated optical assembly 10 is its ability to actively reduce or eliminate the effects of long-term (low frequency) disturbances that would otherwise degrade the optical performance of the optical head assembly 10. One example of such a disturbance is the thermally-induced mechanical deformations of the optical assembly structure, due to changes in the ambient temperature, or due to the heat generated by the beam source.

Figure 3:
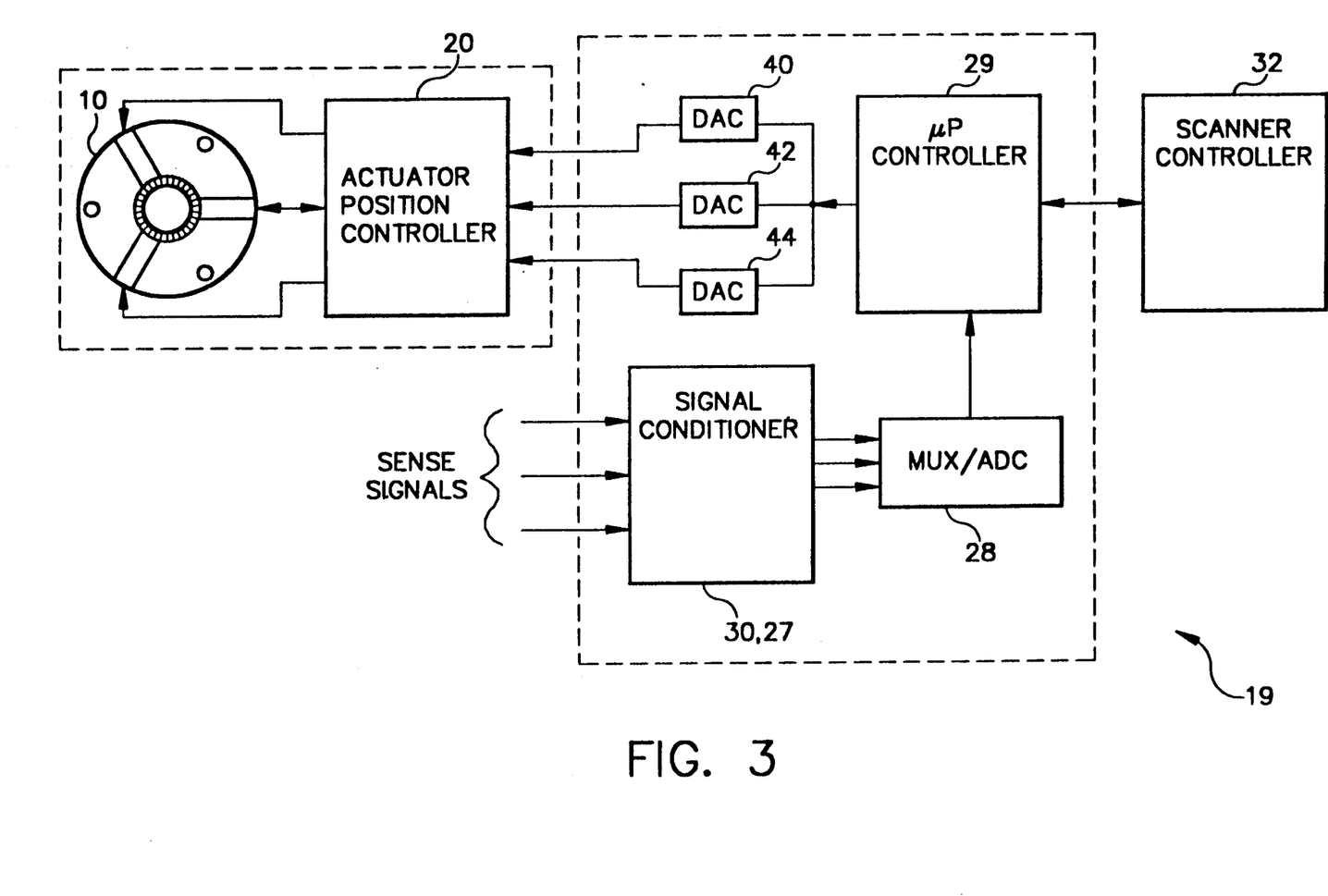
FIG. 3 is a simplified schematic representation of the optical head assembly and a control system operative in the beam scanning system of FIG. 2.

The preferred beam scanning system 18 illustrated in FIG. 2 includes a preferred actuator control system 19 that is shown in detail in FIG. 3. The beam scanning system 18 includes an optical head assembly 10, an optical head assembly controller 20, a beam deflector 21, a beam deflector motor controller 22, and a beam source controller 23. A stationery collimated light beam 24 output from the optical head assembly 10 is modulated according to signals from the beam source controller 23 and directed to the beam deflector 21 for imparting a scanning motion to the stationary beam. The scanning beam 25 is incident on a scanned medium 26 along a scan line 26A. The optical quality of the scanning beam 25 is detected by various sense means that includes, for example, first and second beam position detectors D1 and D2 located at the start of scan and end of scan, respectively. Similarly, temperature sense signals as provided by thermistors located in the optical head assembly 10 are conditioned by a signal conditioner 30 and also received by the data acquisition system 28. Sense signals from other sensors, such as beam defocus sensors 31, may be similarly provided to the signal conditioner 30. Analog sense signals, for example, are preferably received by the signal conditioners 27, 30 before being converted to digital values and multiplexed by the data acquisition system 28.

Concurrently, a scanner controller 32 receives processed image data from a master controller 33 and in response directs control signals to the beam deflector controller 22, beam source controller 23, and optical head assembly controller 20. The scanner controller 32 preferably includes a dedicated digital controller that supervises the beam deflector controller 22 and beam source controller 23 to provide advantageous performance objectives, such as a constant beam scan velocity and an accurately controlled beam intensity.

Figure 4:
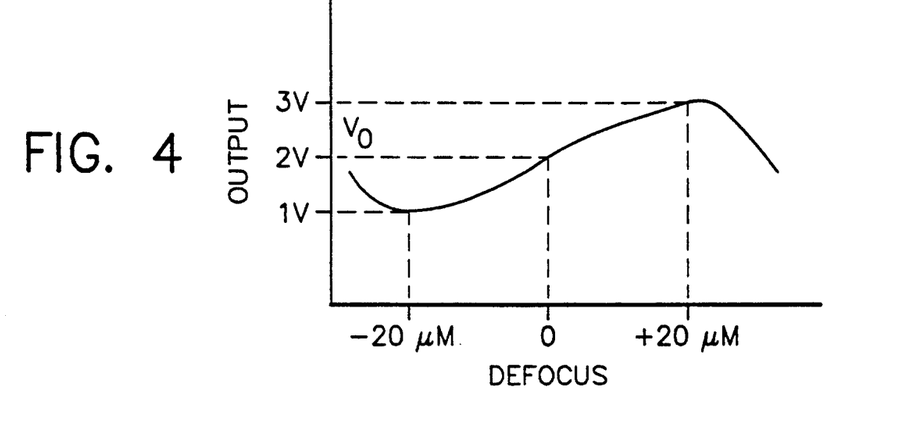
FIGS. 4-6 are graphical representations of exemplary sense signals that are operative in the system of FIG. 2.
Figure 5:
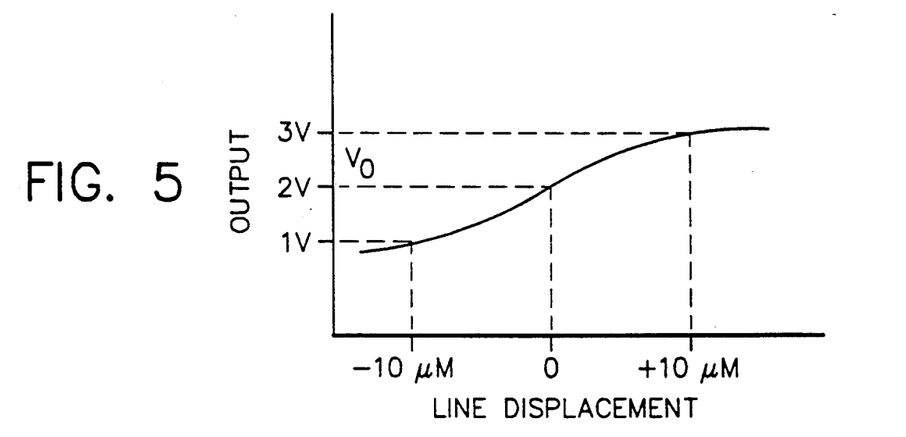
Figure 6:
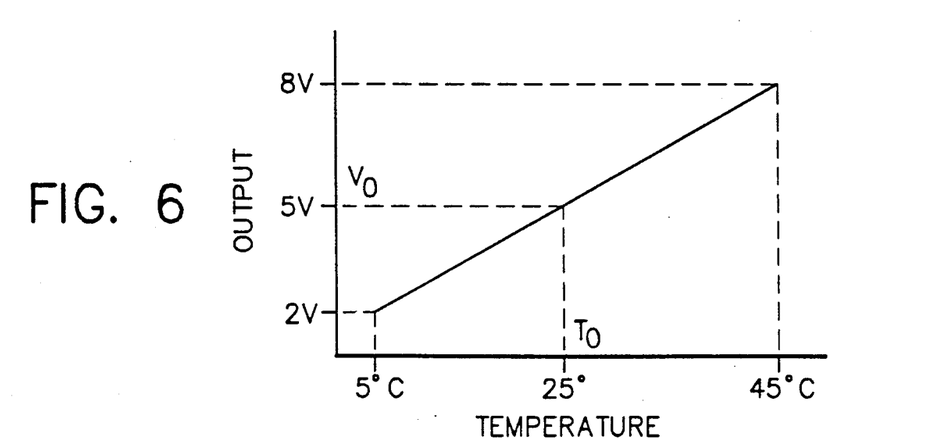

Simplified representations of preferred sense signals are illustrated in FIGS. 4-6. A focus sensor output signal is illustrated in FIG. 4; a beam position sensor output signal is shown in FIG. 5; and a thermistor temperature output signal from a linearized thermistor is shown in FIG. 6. (The foregoing description and number of sense signals is, however, meant to be illustrative and not limiting; other sense or feedback signals may be useful according to the particular application of the beam scanning system and as known in the art.)

The computer 29, as will be discussed below, computes actuator control signals according to an influence matrix derived from a series of system transfer functions. Respective digital to analog converters 40, 42, and 44 may be used to convert the digital output of the computer to analog control signals before they are received by the optical head assembly controller 20. The controller provides scaled control signals to the respective actuators so as to effect the required actuator movements.

As further illustrated in FIG. 7, the actuator elements are operated by using the scaled control signals to set the temperatures of the TEC elements 112-1 to selected levels respectively above and below ambient temperature so that one linear actuator element 114-1 may be caused to expand while the other 114-2 is unchanged, or made to contract. (For example, in FIG. 7, the leftmost element 114-1 is shown expanded while the adjacent element 114-2 is contracted; the reverse may be implemented according to the temperature selection of the TEC 112-1 and by the selection of the CTE values of the linear actuator elements.) The two upper yoke flexures 126-1, 126-2 couple the mounting bar 128 to the linear actuator elements and define the vertical position of the center of rotation. The length differential of the linear actuator elements confines the center of rotation of the mounting bar 128 to the actuator center line.

Figure 8:
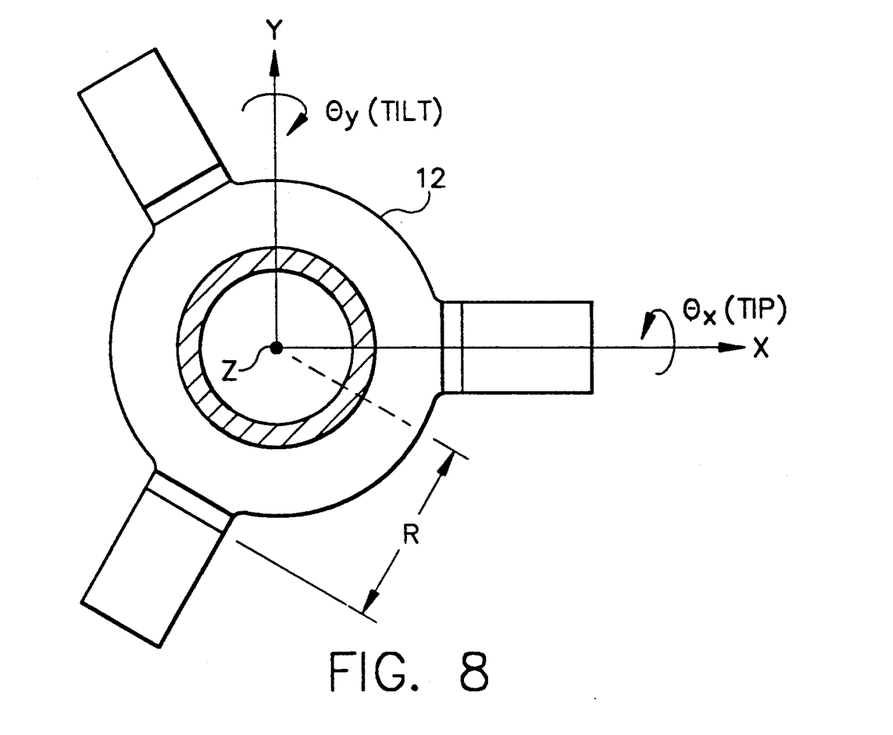
FIG. 8 is a top view of the flexure plate in the optical head assembly of FIG. 7, with representations of the tilt, tip, and x, y, and z axial motions of the collimating lens.

With reference also to FIG. 8, it will be appreciated that due to the elastic coupling by the elastic kinematic hinges between the lens mount 13M and the actuators 14A, 14B, 14C, the selective operation of one or more of the actuators allows one to obtain a highly accurate, selectably controllable rotation angle $\phi$ and/or a resulting displacement dR in the collimating lens radial position R so as to effect tilting $\theta_y$, or tipping $\theta_x$ of the collimating lens. Alternatively, the actuators 14A, 14B, 14C may be operated in unison to provide a highly-accurate, selectably-controllable z axial displacement of the collimating lens along the optical axis 13A. Such z axial motion of the collimating lens is useful not only to achieve active athermalization of the collimating lens 13, but also for adjustment of, for example, beam focusing. A still further alternative is a selected operation of the actuators to provide a desired combination of tilt $\theta_y$, tip $\theta_x$, z axial motion, x axial motion, or y axial motion of the collimating lens.

The combined athermalization and control of the collimating lens in the optical head assembly 10, in the manner taught herein, has several advantages. Most importantly, the desired compensation for the perturbations and nonlinearities that influence the optical performance of the optical head assembly may be implemented automatically by extremely accurate displacements of the collimating lens in one of five degrees of freedom (axial x, axial y, axial z, tilting $\theta_y$, or tipping $\theta_x$). Proper selection of the actuator controller signals allows the collimating lens position to be electronically controlled, thus allowing important optical performance parameters, such as beam focus and beam position, to be controlled more easily and accurately than found in conventional apparatus.

Accordingly, the optical head assembly is contemplated for use in, for example, a beam scanner whereby the range, resolution, and accuracy of the scanning beam can be optimized even while beam scanning is occurring, by active adjustment of the collimating lens position. The present invention thus contemplates the use of additional feedback signals from, for example, a beam focus or beam alignment sensor such that the scanning beam can be controlled in a closed-loop, "on the fly" manner. Similarly, accurate control of the light beam focusing, position, or motion (while compensating for changes in ambient temperature, humidity, or other variations of system parameters) can be accomplished by feedback from still other appropriate sensors.

Figure 9:
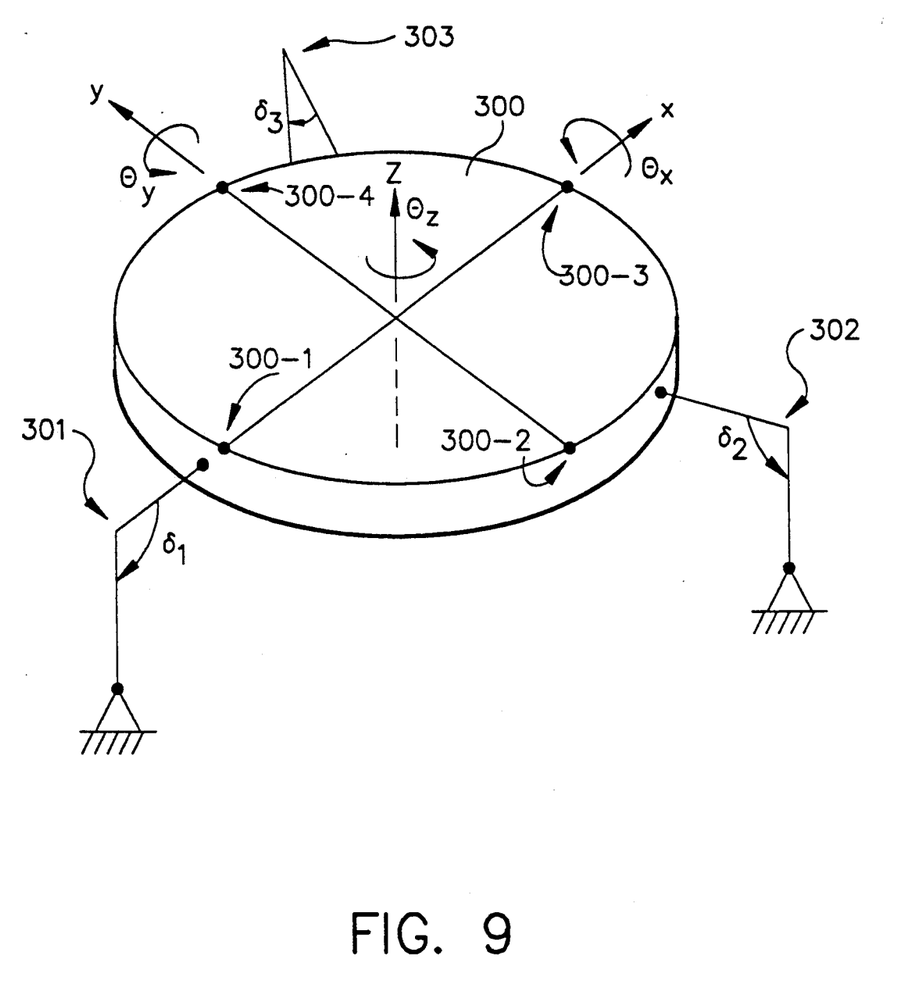
FIG. 9 is a simplified representation of the flexure plate of FIG. 8, with variables illustrated for use in deriving transfer function matrices that are useful in determining the optical performance parameters of the optical head assembly.

Because the contemplated optical head assembly and control system may be considered as operating linearly, the present invention contemplates the derivation of a series of transfer functions that relate the selective operation of the three actuators 14A, 14B, and 14C to the desired lens displacement. Finite element analysis of the actuator/lens system, for example, will allow the determination of the requisite geometric changes that may be effected by each actuator. With reference now to FIG. 9, the optical head assembly 10 may be understood as receiving three actuator-induced displacement forces, the combined effect of which results in one or more of the following: an angular displacement $\theta$, a radial displacement dR, or an axial displacement $\delta$.

According to a particular feature of the present invention, the series of transfer matrices are calculated in advance to provide an influence matrix that allows a contemplated control system to receive sensor input values, and, in response, provide actuator position control signals that are useful in accurate and predictable control of the scanner optical performance parameters, such as beam position or beam focus. The geometric variables that affect optical performance are included in a first transfer function matrix that combines variables for tip, tilt, x translation, y translation, and piston (z translation) of the collimating lens. The actuator output variables can be defined in terms of a second transfer function matrix that includes the variables $\theta$, $\phi$, $\delta$, and dR as effected by each actuator. The second transfer matrix is then multiplied with the first to obtain a third transfer function matrix. The second transfer matrix is then multiplied with the first to obtain a third transfer function matrix, within which are the coefficients that relate a given actuator control input with the desired optical geometry. A fourth transfer function matrix is then derived to relate temperature, focus, and beam position to the desired optical geometry. Multiplying the third and fourth transfer function matrices produces a final, system influence matrix that relates the aforementioned plural sense signals to the desired improvement in beam quality and beam position.

Because the optical head assembly and control system is not fully kinematic but relies on elastic equilibrium of the plastic hinges in the optical head, an "over constrained" relation is formulated. An analytical model such as that shown in FIG. 9 may be used, wherein the collimating lens is modeled as a rigid disk 300 attached to simple elastic hinges 301, 302, 303; the movement of the lens is then modeled as a result of perturbations provided by the individual actuators that are adjacent the respective elastic hinges. A first finite element model is used to determine actuator stiffness and equivalent hinge stiffness. A second finite element model is used to determine the positions of points 300-1 through 300-4 that change as a result of the application of 1 unit of angular displacement $\delta_1$. The x, y, z, $\theta_x$, $\theta_y$, $\theta_z$ motions of the disk can then be determined via computation of their relationship to the geometry and the movement of points 300-1 through 300-4. The foregoing steps are repeated with respect to angular displacements $\delta_2$ and $\delta_3$ (other $\delta_n$ are set to zero) to obtain a transfer function matrix as follows:

$$\begin{Bmatrix} S_1 \\ S_2 \\ S_3 \end{Bmatrix} = \begin{bmatrix} C_{11} & C_{12} & C_{13} & C_{14} & C_{15} & C_{16} \\ C_{21} & C_{22} & C_{23} & C_{24} & C_{25} & C_{26} \\ C_{31} & C_{32} & C_{33} & C_{34} & C_{35} & C_{36} \end{bmatrix} \begin{Bmatrix} x \\ y \\ z \\ \theta_x \\ \theta_y \\ \theta_z \end{Bmatrix}$$

which may be simplified to:

$$\{S\} = [C]\{d\}$$

An optical transfer function is also developed to determine the effect of lens movement on selected beam scanning performance parameters such as defocus and vertical spot movement. The foregoing approach is used again, where 1 unit of x, y, etc. motion is used to determine matrix element values:

(for $x = 1, y = z = \theta_x = \theta_y = \theta_z = 0$):

$$\begin{Bmatrix} D_y \\ D_z \end{Bmatrix} = \begin{bmatrix} K_{11} & 0 & 0 & 0 & 0 & 0 \\ K_{21} & 0 & 0 & 0 & 0 & 0 \end{bmatrix} \begin{Bmatrix} 1 \\ 0 \\ 0 \\ 0 \\ 0 \\ 0 \end{Bmatrix}$$

(and for $y = 1, x = z = \theta_x = \theta_y = \theta_z = 0$):

-continued $$\begin{Bmatrix} D_y \\ D_z \end{Bmatrix} = \begin{bmatrix} 0 & K_{12} & 0 & 0 & 0 & 0 \\ 0 & K_{22} & 0 & 0 & 0 & 0 \end{bmatrix} \begin{Bmatrix} 0 \\ 1 \\ 0 \\ 0 \\ 0 \\ 0 \end{Bmatrix}$$

to provide:
$$\{D\} = [K]\{d\}$$

It is then necessary to perform a generalized inverse transformation via singular value decomposition to obtain:

$$\{d\} = [K]^{-1}\{D\}$$

Since the system is over-constrained once again, the solution is only approximate. The result is:

$$\begin{Bmatrix} S \\ 3 \times 1 \end{Bmatrix} = \begin{bmatrix} C \\ 3 \times 6 \end{bmatrix} \begin{bmatrix} K \\ 6 \times 2 \end{bmatrix}^{-1} \begin{Bmatrix} d \\ 2 \times 1 \end{Bmatrix}$$

Because the foregoing influence matrix computational method uses a transfer function appropriate to the particular embodiment of the optical head assembly, it will be appreciated that embodiments of an optical head assembly than that shown herein may be successfully controlled with use of respective influence matrices as taught herein. Also, because the optical head assembly is contemplated as being controlled according to a digitally-based control system, other transfer functions may be substituted that reflect the characteristics of sense signals and control variables that differ from those described herein.

The contemplated optical head assembly is relatively simple to construct and has no frictionally-engaged parts, and thus is capable of operating with an inherently high reliability over a long life. Precision assembly and installation of the optical head assembly is not critical, since its performance variations may be canceled by defining a baseline electronic calibration after the optical head assembly is manufactured and installed. Such calibration may be calculated without resort to a sophisticated optical alignment system, and if calibration is necessary, the above-described adjustment by remote control of the thermal rotary actuators allows one to calibrate the optical head assembly without dismantling the assembly.

As is evident from the foregoing description, certain aspects of the invention are not limited to the particular details of the examples illustrated, and it is therefore contemplated that other modifications and applications will occur to those skilled in the art. It is accordingly intended that the claims shall cover all such modifications and applications as do not depart from the true spirit and scope of the invention.

What is claimed is:
1. A beam scanning system, comprising:
an optical head assembly for controlling the provision of a collimated light beam in response to an applied optical head control signal;

a beam deflector for imparting a scanning motion to the collimated light beam to thereby produce a scanning beam;

sense signal provision means for providing sense signals indicative of one or more parameters indicative of the optical performance of the scanning beam; and a control system, responsive to the sense signals, for computing said optical head control signal according to a predetermined beam scanning system influence matrix.

2. The beam scanning system of claim 1, wherein the optical head assembly further comprises:

(a) a collimating optics mount including a flexure plate, light beam collimating optics fixed on the flexure plate and thereby defining an optical axis, and three flexure plate extensions being substantially equally distributed about the optical axis and each being attached to the flexure plate at a respective elastic kinematic hinge; and (b) a light beam source mount having located thereon actuator means and a light beam source so as to direct a light beam through said collimating optics, said actuator means being operatively connected to each of the flexure plate extensions for selective coupling of a displacement force through the respective elastic kinematic hinge to effect an adjustment of the position of the collimating optics with respect to the beam source.

3. The beam scanning system of claim 2, wherein the actuator means further comprises three actuators each of which being operatively connected to a selected one of the extensions, and each being responsive to an actuator drive signal.

4. The beam scanning system of claim 3, wherein the control system further comprises actuator control means for receiving collimating optics positioning signals and for converting said signals to provide an actuator drive signal.

5. The beam scanning system of claim 4, wherein at least one actuator comprises a thermal rotary actuator that includes:

(a) an actuator body having first and second spaced linear actuator elements, each linear actuator element having a respective predetermined coefficient of thermal expansion and respective first and second ends defining the linear actuator element length, said linear actuator elements, in response to a temperature differential therebetween, being thereby subject to a predetermined length differential, and means for effecting the selected temperature differential in the first and second linear actuator elements to achieve the predetermined length differential in response to an actuator drive signal;

(b) first yoke means for receiving the first ends of the first and second linear actuator elements, including fixing means for fixing the first ends in a predetermined spatial relationship and means for flexibly attaching said first ends to the light beam source mount; and (c) second yoke means for receiving the second ends of the first and second linear actuator elements and for flexibly attaching the second ends of the first and second linear actuator elements to a selected flexure plate extension to thereby translate the predetermined length differential to a proportional displacement of the extension.

6. The beam scanning system of claim 2, wherein the influence matrix is preprocessed according to a series of transfer functions, said series including:

(a) a first transfer function matrix that includes one or more geometric variables for defining tip, tilt, x translation, y translation, and z translation of the collimating optics;

(b) a second transfer function matrix that includes one or more of the variables $\theta$, $\phi$, $\delta$, and dR as effected by a given actuator where $\theta$ is an angular displacement of a given actuator, $\phi$ is a rotation angle of the collimating optics, $\delta$ is an axial displacement of a given actuator, and dR is a radial displacement of the collimating optics;

(c) a third transfer function matrix derived from the first and second transfer functions so as to include one or more coefficients that relate the optical head control signal with a desired collimating optics position; and (d) a fourth transfer function matrix that relates the acquired sense signals to the desired collimating optics position.

7. The beam scanning system of claim 1, wherein the sense signal provision means includes first and second beam position detectors located at the start of scan and end of scan, respectively.

8. The beam scanning system of claim 1, wherein the sense signal provision means includes means for providing one or more temperature sense signals indicative of temperatures in the optical head assembly.

9. The beam scanning system of claim 1, wherein the control system further comprises:

(a) a data acquisition system for acquiring the sense signals and providing acquired sense signals; and (b) a computer for receiving said acquired sense signals and for computing actuator control signals in response to the influence matrix, said matrix being derived from at least one transfer function predetermined according to the relationship of the sense signals to the optical performance of the beam scanning system.

10. The beam scanning system of claim 9, wherein the data acquisition system further comprises signal conditioning circuitry and signal multiplexing circuitry.

11. The beam scanning system of claim 9, wherein the data acquisition system further comprises analog to digital signal conversion circuitry.

* * * * *